March 29, 1960 G. EANNARINO ET AL 2,930,948

SEMICONDUCTOR DEVICE

Filed March 9, 1956

Inventors
George Eannarino
and George B. Finn Jr.
by
Mason, Kolehmainen, Rathburn and Wyss.
Attorneys.

2,930,948
Patented Mar. 29, 1960

2,930,948

SEMICONDUCTOR DEVICE

George Eannarino and George B. Finn, Jr., Bloomington, Ind., assignors to Sarkes Tarzian, Inc., Bloomington, Ind., a corporation of Indiana Application March 9, 1956, Serial No. 570,577
9 Claims. (Cl. 317—234)

The present invention relates to semiconductor devices, and more particularly to semiconductor diode constructions which are sturdy and compact in construction, reliable in use under severe environmental conditions, and inexpensive to manufacture on a quantity production basis.

Diode rectifiers utilizing semiconductor devices have been available on the market for a number of years, but for the most part leave much to be desired in the way of cost and operation. For example, the current carrying capacity of such diodes has been small as compared to their overall size because of their inability, among other things, to dissipate the heat which is generated at the semiconductor junction during the rectification operation. Moreover, because of the inherent nature of the constructional design of the prior art semiconductor rectifiers, the shrinkage during manufacturing has usually been in the neighborhood of 90 percent, thereby resulting in a particularly high manufacturing cost per usable rectifier.

Also, the prior art type rectifiers are particularly fragile and, therefore, must be carefully handled when in use and even then are frequently damaged. Therefore, a principal object of the present invention is to provide a new and improved semiconductor rectifier which has a high current carrying capacity as compared with its overall size, which has a good forward-to-reverse current ratio and which may be manufactured at a cost which is substantially less than that of the semiconductor rectifiers known in the prior art.

Another object of the present invention is to provide a new and improved method for manufacturing high quality semiconductor diodes at a sufficiently low cost to make such devices competitive with other types of rectifiers presently on the market.

A further object of the present invention is to provide a new and improved semiconductor rectifier assembly which is extremely small in size, sturdy in construction and reliable in operation, and which may be used under severe operating conditions such as are encountered in equipment used in airplanes, rockets and other airborne devices.

Briefly, the above and further objects are realized in accordance with the present invention by providing a hermetically sealed housing consisting of two high mass terminals spaced apart by an insulating sleeve which houses a P-N junction semiconductor. The semiconductor is disposed within the sleeve and the opposite sides of the semiconductor junction are connected to the respective terminals through large area contact surfaces thereby to decrease the electric resistance of the diode and to provide heat conduction paths of high heat conductivity on both sides of the semiconductor junction.

The invention both as to its organization and method of operation, together with further objects and advantages thereof, will best be understood by reference to the following specification taken in connection with the accompanying drawings, in which.

Figures 1, 2, 3:
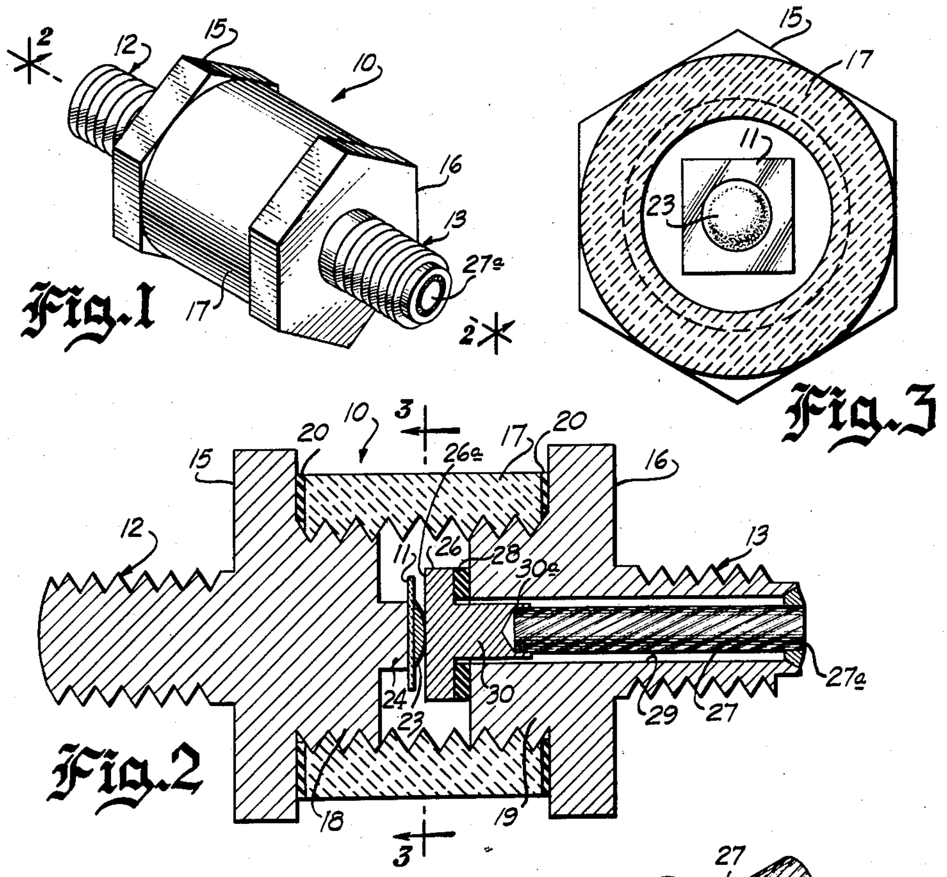
Fig. 1 is a perspective view of a semiconductor diode embodying the present invention.
Fig. 2 is a sectional view of the diode of Fig. 1 taken along the line 2—2 thereof.
Fig. 3 is a sectional view of the diode of Fig. 1 taken along the line 3—3 of Fig. 2, assuming the entire rectifier to be shown in Fig. 2.

Referring now to the drawing and more particularly to Figs. 1 and 2 thereof, a semiconductor diode 10 comprises a hermetically sealed housing enclosing a P-N junction semiconductor 11. The housing has oppositely directed axial terminal studs 12 and 13 which are respectively connected to opposite sides of the semiconductor 11. The studs 12 and 13 are provided with external threads, as shown, and since they are rigidly attached to the diode housing, they may be used for physically mounting the diode 10 as well as for operatively connecting it in an electric circuit. In addition, the studs 12 and 13 may be attached to suitable external heat sinks (not shown) for enabling the use of the diode 10 in very high current applications by translating to the surrounding medium relatively high amounts of heat.

In accordance with the present invention, and as best shown in Fig. 2, the terminal studs 12 and 13 are provided with integral heat dissipating flanges 15 and 16 which are secured over the opposite ends of an insulating sleeve 17. The sleeve 17 may be formed of suitable ceramic material and a hermetically tight seal may be provided, in any suitable manner, between the sleeve 17 and the flanges 15 and 16. In the embodiment of the invention illustrated in Fig. 2, a pair of flat silicone washers 20 cemented to the sleeve 17 and to the flanges 15 and 16 provide this seal. Since a rigid mechanical connection between the mounting studs or terminals 12 and 13 and the sleeve 17 is desirable, threaded studs 18 and 19 are respectively provided on the inner faces of the flanges 15 and 16 for reception in the threaded bore of the sleeve 17. The flange portions 15 and 16 may extend beyond the external edges of the sleeve 17 so as to provide a larger heat radiating surface. In addition, the flanges 15 and 16 may be provided with hexagonal flats on the exposed edges thereof to enable the use of conventional wrenches for mounting diode 10 in utilization equipment.

The semiconductor 11 is preferably a P-N junction disk or dice of relatively small thickness having a semiconductor junction which is substantially parallel to and disposed intermediate the external faces of the disk. A metallic dot or spot 23 is centrally located on one side of the semiconductor 11 and bonded to the adjacent face thereof throughout a substantial area. As best shown in Fig. 3, the dot 23 is spaced from the edges of the semiconductor disk so as to provide a large leakage resistance path between opposite sides of the semiconductor 11. The side of the disk on which the dot 23 is located ordinarily depends upon the particular technique employed in forming the P-N junction. For example, if the junction is formed by an alloying process in which acceptors are added to one side of an N-type crystal disk, the metallic dot is most conveniently on the P side of the semiconductor 11. On the other hand, if donors are added to a P-type crystal in order to form the semiconductor junction, the metallic spot is usually provided on the N-side of the semiconductor 11. For purposes of describing the diode of the present invention but not by way of limitation, it will be assumed that the semiconductor 11 is provided with the metallic dot 23 on the P side of the junction.

As shown, the N side of the semiconductor 11 is centered on and attached, for example, as by soldering, to a mounting surface on an axial boss 24 which extends from the stud 18. Accordingly, in the diode 10, the stud or the terminal 12, which is connected to the N side of the semiconductor 11, is the cathode terminal, and the stud or terminal 13, which is electrically connected to the P side of the semiconductor 11, is the junction or anode terminal.

In order to enable the translation of high currents of the order of five amperes through the semiconductor 11, a large area contact is provided between the stud 13 and the P side of the semiconductor 11. In a reduction to practice of the invention, this contact area was of the order of three hundredths of a square inch. In most prior art types of semiconductor diodes this connection is in the form of a very thin wire or "cat's whisker," having a pointed end which engages the semiconductor. Since the "cat's whisker" type of contact is incapable of carrying high currents, such diodes are unsuited for many applications. Another important advantage of the construction of the present invention is that by providing a large cross-sectional area connection between the anode terminal 13 and the semiconductor 11, a good heat conduction path is provided from the semiconductor junction to the heat radiating surface of the terminal 13, i.e., the flange 16 and to any external heat sink (not shown) which may be connected to the stud 13.

In order to provide the large area connection to the dot 23 on the semiconductor 11, a contact button 26, which has a large facial area **26*a* is electrically connected through a flexible conductive cable 27 to the stud 13. As shown, the facial area 26*a* is flat but it will be clear to those skilled in the art that under certain circumstances other configurations such as a concave or even irregular surface may be desirable. However, irrespective of the shape of the facial area 26*a*, it is necessary that the button 26 contact only the button 23** and not the exposed surface of the semiconductor crystal.

In accordance with another aspect of the present invention, the dot 23 is relatively soft so that when the contact button 26 is pressed against it, the dot 23 may be partially deformed thereby to insure that a large area contact connection is provided. It will thus be seen that there is provided a good heat conductive path to the terminal member 13 for the heat which is generated at the semiconductor junction. There is a similar good heat conductive path from this semiconductor junction to the cathode terminal 12. However, as a practical matter, most of the heat generated at the junction is dissipated through the anode terminal 13.

Since the diode 10 is intended for use in applications wherein the temperature varies throughout a wide range, the contact button 26 is resiliently pressed against the dot 23 by means of a resilient washer 28 so that as the terminal structures comprising the studs 18 and 19, the flanges 15 and 16 and the terminals 12 and 13 expand and contract in response to temperature changes, the semiconductor 11 is not subjected to excessive compressive forces which would cause it to crack or otherwise fracture. Considered more in detail, the terminal 13 is provided with a central bore 29 through which the flexible conductor 27 freely extends. The contact button 26 is maintained in substantial alignment with the semiconductor 11 by means of an axial stud 30 thereon which extends into the bore 29 and is secured at the inner end thereof to the conductor 27. Preferably, a slip fit is provided between the stud 30 of the contact button 26 and the bore 29 of the terminal 13. As shown, the inner end of the cable 27 may be attached to the stud 30 of the contact button 26 by soldering the end thereof in the drilled axial hole **30*a* provided in the end of the stud 30. The conductor 27 is soldered to the end of the terminal 13 to complete the electric and heat conduction path from the contact button 26 to the anode terminal 16. Preferably, the conductor 27 is a stranded cable formed of a plurality of relatively thin conductive wires to provide the necessary flexible connection between the terminal 13 and the contact button 26. Consequently, the contact button 26 is movable through a small axial distance toward and away from the semiconductor 11. Control of the magnitude of the force which is exerted on the contact button 26 to press it against the dot 23 when the flange 16 of the anode terminal 13 is brought up tightly against the adjacent end of the sleeve 17 is provided by means of the resilient washer 28. The washer 28 is preferably formed of silicone since this material retains its resiliency at the high temperatures at which the diode 10** may be operated. It should be understood, of course, that if the temperature and other operating conditions permit, a rubber washer or even a metallic spring may be used for this purpose.

A hermetically tight seal may be conveniently effected between the stranded cable 27 and the terminal member 13 by positioning the end **27*a* of the cable in close proximity to the end of the terminal member 13 and soldering the cable 27 to the member 13** by dipping the connection in a pool of molten solder.

In the embodiment of the invention described above in connection with the diode 10, the semiconductor 11 is mounted within a hermetically sealed housing and both sides of the semiconductor junction are directly connected through large cross-sectional area connections to appreciably high mass electrode terminals 12 and 13. By virtue of the fact that the studs 18 and 19 of the terminals 12 and 13 extend an appreciable distance into the bore of the sleeve 17, a relatively long sleeve may be employed and the flanges 15 and 16 may be widely spaced apart, thus allowing an external leakage path between the flanges 15 and 16 across the external surface of the sleeve 17 which is sufficiently long so as not to break down even under extremely adverse environmental conditions. Although the internal leakage path of the diode 10 between the terminal studs 18 and 19 is relatively short, this path is hermetically sealed from the surrounding environment, and there is no appreciable leakage current across it at voltage values greatly exceeding those at which breakdown may occur across the external path under adverse operating conditions.

In order to reduce the cost of the diode 10 for applications in which the environmental operating conditions are more or less ideal, the sleeve 17 may be formed of a porous, insulating material such as the so-called plastic materials and hermetically tight seals need not be provided between the ends of the sleeve 17 and the respective terminal flanges 15 and 16. However, under most conditions of operation it is desirable that the semi-conductor 11 be mounted in a hermetically sealed chamber.

Although the junction semiconductor 11 may consist of any suitable semiconductor material such, for example, as germanium, silicon, etc., it is desirable, because of the fact that silicon has a greater current carrying capacity than germanium and other useful semiconductor materials, that the semiconductor 11 consist of silicon with the necessary impurities added to effect a P-N junction intermediate the opposite faces thereof.

Figure 6:
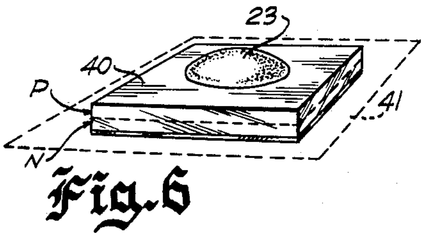
Fig. 6 is a perspective view of a P-N junction semiconductor suitable for use in the diodes illustrated in Figs. 1 and 5.
Figure 4:
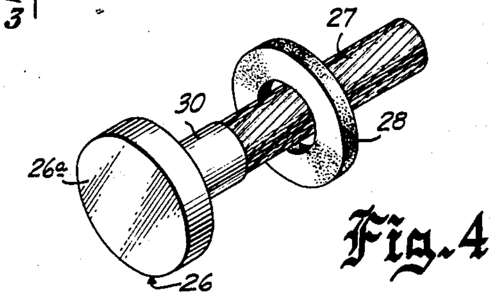
Fig. 4 is an exploded perspective view of a portion of an anode suitable for use in a diode embodying the present invention.

In accordance with another important aspect of the present invention there is provided an improved method for making a P-N junction silicon semiconductor, which method is presently described in conjunction with the semiconductor shown in perspective in Fig. 6. The semiconductor there shown comprises a rectangular silicon disk or dice 40 having a P-N junction plane 41 separating the positive or P portion of the semiconductor which is at the top of the crystal, as viewed in Fig. 6, and the negative or N portion of the crystal 40 which is at the bottom as viewed in Fig. 6. It will be understood by those skilled in the art that the semiconductor junction is not absolutely planar but may have varying degrees of irregularity depending to a large extent upon the technique used to form it. For purposes of describing the invention, however, it may be assumed to be planar. The entire crystal dice 40, which is shown as being rectangular but which may be circular or of any other shape, is initially cut from a large single crystal of N-type silicon. This crystal may be grown in accord with well known methods from a silicon melt which contains a controlled amount of a suitable donor impurity such as, for example, antimony. In order to form the junction, a controlled amount of acceptors are added to the upper side of the crystal 40 by first placing a metallic dot consisting of aluminum and gallium on the upper face thereof, then placing a second metallic dot consisting of substantially pure tin on top of the first dot and firing the combined unit. If desired, a thin sheet of tin may be placed beneath the crystal 40 so as to form a substantially ohmic connection to the bottom of the crystal when the unit is fired. In order to fire the unit, it is elevated to a temperaure in the vicinity of 950 degrees centigrade such that the aluminum and the adjacent portions of the silicon crystal 40 form an aluminum-silicon eutectic which melts and permits the gallium, which supplies a portion of the acceptors to the crystal 40, to be dissolved into the upper portion of the silicon crystal. At this temperature the tin melts and spreads throughout the dot to soften it so that when the unit is cooled and the silicon recrystallizes, the crystal 40 is not cracked or otherwise stressed because of the differences in the temperature coefficients of expansion of the silicon crystal and the dot. In the absence of the tin, the spot 23 is relatively hard, thereby placing a permanent stress in the semiconductor crystal when the unit cools after firing. The presence of tin in the dot 23 softens it, thereby eliminating these undesirable stress patterns. Moreover, as indicated above, the soft dot insures a good heat and current conducting connection between the crystal and the anode terminal.

While the semiconductor and dot are being fired, the tin sheet at the bottom of the crystal 40 melts and alloys with the lower portion of the crystal to form a substantially ohmic junction which, as described above, facilitates the soldering of the crystal to the cathode terminal. Although the tin may be added directly to the aluminum and gallium dot, since tin and aluminum are not miscible, the preferred method of forming a soft dot is to place a pure tin dot on top of an aluminum and gallium dot which has first been placed on the crystal 40.

Although the P-N junction in the silicon crystal may be formed in the above manner, it may also be formed by growing a P-type crystal with a controlled amount of acceptors and then providing a metallic dot containing a donor material such, for example, as antimony or boron and a second dot of tin before firing. In a P-N junction silicon semiconductor formed in this manner, the soft metallic dot on the completed crystal is on the negative or N side of the junction.

In accordance with a preferred method of fabricating the diode 10, the junction semiconductor 11 is first formed so as to provide a thin layer of a good conductive metal such as tin on one side thereof and a soft metallic dot 23 on the other side thereof. The tinned side of the semiconductor 11 is then centered on and soldered to the mounting surface or face of the boss 24 on the stud 18. The contact button 26, which is preferably formed of silver although any other good conductive material could be used for this purpose, is soldered over the end of a cable 27 and the free end of the cable 27 is then inserted through the washer 28 and the bore 29 of the anode terminal 13. Next, the free end of the cable 27 is sliced off at 27*a* in the vicinity of the end of the terminal 13 and the anode subassembly is dipped into molten solder to provide a good electric and heat connection between the cable 27 and the stud 13, and in addition, to provide a hermetically tight seal between these members so that the anode assembly is imperforate. The faces of the washers 20 are then coated with a cement, such as, an epoxy resin, and slipped over the respective studs 18 and 19. The cathode 12 and the anode 13, which may be formed of copper or any other good electric current and heat conducting material, are then threaded into the opposite ends of the sleeve 17, until the washers 20 and the washer 28 are slightly compressed. When the epoxy resin is cured, either at room temperature or otherwise, the diode is completed and ready for use.

We have found that when high currents are first passed through the diodes 10 during testing the dot 23 is welded throughout a relatively large area to the face of the contact button 26. Obviously, the resistance of this joint to both electric current and heat is reduced when this weld is made.

While it is understood that the materials used to construct the different parts of the rectifier 10 may be varied according to the design and application of the rectifier, and while it is understood that the various dimensions of these parts may also vary according to the design and application, the following materials and dimensions have been found to provide a high quality rectifier which operates satisfactorily under extremely severe environmental conditions to effect the results listed below.

*Materials*

| | |
|---|---|
| Terminals **12** and **13** | Copper. |
| Sleeve **17** | Ceramic. |
| Semiconductor **11** | Silicon. |
| Metallic dot **23** | Aluminum. Gallium. Tin. |
| Contact button **26** | Silver. |
| Stranded cable **27** | Copper. |

*Dimensions*

| | | |
|---|---|---|
| Width of flanges **15** and **16** | inch | 5/8 |
| Thickness of flanges **15** and **16** | do | 7/16 |
| Overall length of terminals **12** and **13** | do | 25/32 |
| Length of sleeve **17** | do | 1/2 |
| Outside diameter of sleeve **17** | do | 9/16 |
| Thickness of semiconductor **11** | do | .01 |
| Face area of semiconductor **11** | square inches | 1.06 |

*Electrical specifications*

Minimum forward current at 25 degrees centigrade, 5 amps.—1.5 volts.

Figure 5:
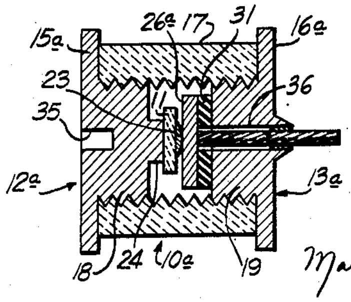
Fig. 5 is a sectional elevation view of an alternative embodiment of a semiconductor rectifier embodying certain aspects of the present invention.

Referring to Fig. 5, there is shown an alternative embodiment of the invention in which the stud portions of the terminals 12 and 13 are respectively replaced by a plurality of cylindrical recesses 35 and 36. The other parts of the diode, which is indicated as 10*a*, are substantially the same as those employed in the diode 10 and, accordingly, are provided with similar reference numerals. Those parts which perform the same functions but which are structurally modified are designated with the suffix "*a*."

In order to connect the diode 10*a* into the utilization equipment, connections in the form of cylindrical cables or conductors (not shown) are inserted into the recesses 35 and 36 and may be bonded to the respective terminals 12*a* and 13*a* by soldering or welding.

In the embodiment of the invention shown in Fig. 5, the washers 20 have been omitted. A hermetically tight seal may nevertheless be provided by pre-tinning the ends of the sleeve 17 before assembly so that the completely assembled diode 10*a* may be fired in a suitable furnace to effect a seal between the terminal studs 12 and 13 and the sleeve 17.

While the invention has been described in connection with particular embodiments of the invention, it will be understood that various modifications may be made thereon which are within the true spirit and scope of the invention as defined in the appended claims.

What is claimed as new and desired to be secured by Letters Patent of the United States is:

1. A semiconductor diode comprising an insulating sleeve, a P-N junction semiconductor, a first terminal member covering one end of said sleeve and having a portion extending into said sleeve, said semiconductor being disposed within said sleeve and bonded at one side thereof to said portion of said terminal member, a second terminal member covering the other end of said sleeve, and conductive means supported within said sleeve by one of said terminal members and electrically connected to said second terminal, and means resiliently pressing said conductive means against the side of said semiconductor opposite said one side throughout an appreciable area.

2. A semiconductor diode comprising an insulating sleeve, a P-N junction semiconductor, a first imperforate terminal member covering and bonded to one end of said sleeve and having a stud extending into said sleeve, said semiconductor being disposed within said sleeve and bonded at one side of the junction thereof to the end of said stud, a second imperforate terminal member covering and bonded to the other end of said sleeve, conductive means supported within said sleeve by one of said terminal members and electrically connected to said second terminal member, and means for resiliently pressing said conductive means against the side of said semi-conductor opposite said one side of said junction throughout an appreciable area.

3. The diode of claim 1 in which the interior of said sleeve is hermetically sealed by said terminal members.

4. A rectifier assembly comprising a tubular housing, a junction semiconductor disposed within said housing, said semiconductor being symmetrically positioned on the principal longitudinal axis of said housing, the junction of said semiconductor being substantially perpendicular to the principal longitudinal axis of said housing, a relatively large area metallic dot on one face of said semiconductor, said one face being entirely disposed on one side of said junction, a terminal member of substantial mass bonded to the opposite face of said semiconductor and hermetically sealed to said housing over the other end thereof, and said latter terminal member having a contact portion resiliently pressed into engagement with said metallic dot throughout a substantial area.

5. A semiconductor diode comprising a tubular member formed of an insulating material, said tubular member having a threaded bore, a first terminal member formed of a good electric current and heat conductive metal, said first terminal member having an axial stud which is threadedly received in one end of the bore of said sleeve, said first terminal member having a flanged portion which abuts against the adjacent end of said sleeve throughout an area surrounding the said one end of said bore, means for connecting said first terminal member to an external circuit, an axially disposed mounting surface on the end of said stud, a P-N junction semiconductor having a first side and a second side, said first and second sides of said semiconductor being disposed on different sides of a semiconductor junction in said semiconductor, said first side of said semi-conductor being soldered or welded to said mounting surface of said first terminal, a soft metallic dot bonded to said second side of said semiconductor, a second terminal member which is formed of a good electric current and heat conductive metal, said second terminal member having an axial stud which is threadedly received in the end of said bore opposite to the end in which the bore of said first terminal member is threaded, said second terminal member having a flanged portion which abuts against the adjacent end of said sleeve throughout an area surrounding said bore, a contact member having one surface thereof juxtaposed with said second side of said semiconductor, a flexible conductor bonded to said contact member, said flexible conductor being bonded to said second terminal member throughout an area displaced from the connection thereof to said contact member, and resilient means partially compressed between said second terminal member and said contact member for pressing said contact member into firm engagement with said second side of said semiconductor.

6. A semiconductor diode comprising a tubular member formed of ceramic, said tubular member having a threaded bore, a first terminal member formed of a good electric current and heat conductive metal, said first terminal member having an axial stud which is threadedly received in one end of the bore of said sleeve, said first terminal member having a flanged portion which is sealed to the adjacent end of said sleeve through an area surrounding the said one end of said bore, a large cross-sectional area conductive connector means for connecting said first terminal member to an external circuit, an axially disposed boss extending from the end of said stud, a flat mounting surface on the end of said boss, a P-N junction semiconductor having a first face and a second face, said first and second faces being substantially parallel and disposed on opposite sides of a semiconductor junction in said semiconductor, said first face of said semiconductor being soldered or welded to said mounting surface of said boss, a soft metallic dot bonded to said second face of said semiconductor throughout a relatively large area, said dot being spaced from the edges of said semiconductor, a second terminal member which is formed of a good electric current and heat conductive metal, said second terminal member having an axial stud which is threadedly received in the end of said bore opposite to the end in which the bore of said first terminal member is received, a flange on said second terminal member, said flange being sealed to the adjacent end of said sleeve throughout an area surrounding said bore, a contact member having a flat surface thereof engaging the metallic dot on said semiconductor, said contact member being spaced from said semiconductor by said metallic dot, a flexible conductor bonded to said contact member and being disposed within an axial bore in said second terminal member, said flexible conductor being bonded to said second terminal member at a location displaced a substantial distance from the connection to said contact member so as to provide flexibility between said contact member and said second terminal member, and a resilient member partially compressed between said second terminal member and said contact member for pressing said contact member into firm engagement with said second face of said semiconductor.

7. In a semiconductor diode, a semiconductor having a junction therein, a first terminal member to which said semiconductor is bonded, the bonded surface on said semiconductor being on one side of said junction, a soft metallic member bonded to said semiconductor on the other side of said junction throughout a substantial area, and a second terminal member having a large area contact portion resiliently pressed into contact with said soft metallic member.

8. The rectifier assembly of claim 4 in which the hermetically tight seal is effected by means of a partially compressed resilient washer interposed between the terminal member and one end of the tubular housing.

9. A semiconductor diode comprising a housing, an alloyed junction semiconductor disposed within said housing, a terminal member extending partially within said housing and having one side of said semiconductor bonded thereto, a piece of metal bonded to the opposite side of said semiconductor throughout a substantial area, said piece of metal comprising aluminum and a sufficiently large percentage of tin to soften such piece of metal by an amount sufficient to prevent cracking of said semiconductor when it is cooled at the completion of the alloying operation, another terminal member having a large area surface portion disposed adjacent to said piece of metal, and resilient means for pressing said large area surface portion into engagement with said piece of metal to effect a good electric and thermal connection therebetween.

References Cited in the file of this patent

UNITED STATES PATENTS

| | | |
|---|---|---|
| 2,197,115 | Randolph et al. | Apr. 16, 1940 |
| 2,725,505 | Webster et al. | Nov. 29, 1955 |
| 2,751,528 | Burton | June 19, 1956 |
| 2,752,541 | Losco | June 26, 1956 |
| 2,776,920 | Dunlap | Jan. 18, 1957 |
| 2,784,300 | Zuk | Apr. 5, 1957 |
| 2,822,512 | French | Feb. 4, 1958 |